US007737424B2

(12) United States Patent
Xu et al.

(10) Patent No.: US 7,737,424 B2
(45) Date of Patent: Jun. 15, 2010

(54) X-RAY WINDOW WITH GRID STRUCTURE

(75) Inventors: Degao Xu, Provo, UT (US); Eric C. Anderson, Taylorsville, UT (US); Keith W. Decker, Pleasant Grove, UT (US); Raymond T. Perkins, Orem, UT (US)

(73) Assignee: Moxtek, Inc., Orem, UT (US)

( * ) Notice: Subject to any disclaimer, the term of this patent is extended or adjusted under 35 U.S.C. 154(b) by 245 days.

(21) Appl. No.: 11/756,946

(22) Filed: Jun. 1, 2007

(65) Prior Publication Data

US 2008/0296518 A1 Dec. 4, 2008

(51) Int. Cl.

| | |
|---|---|
| ***G02B 5/00*** | (2006.01) |
| ***G21K 1/00*** | (2006.01) |
| ***H01J 1/52*** | (2006.01) |
| ***H01J 3/00*** | (2006.01) |
| ***H01J 5/18*** | (2006.01) |
| ***H01J 29/46*** | (2006.01) |

(52) U.S. Cl. .............. 250/505.1; 250/515.1; 250/517.1; 250/379; 250/374; 250/385.1; 378/161; 378/140; 378/145

(58) Field of Classification Search .............. 250/505.1, 250/515.1, 517.1, 379, 374, 385.1; 378/161, 378/140, 145
See application file for complete search history.

(56) References Cited

U.S. PATENT DOCUMENTS

| | | | |
|---|---|---|---|
| 1,946,288 | A | 2/1934 | Kearsley |
| 2,291,948 | A | 8/1942 | Cassen |
| 2,316,214 | A | 4/1943 | Atlee et al. |
| 2,329,318 | A | 9/1943 | Atlee et al. |
| 2,683,223 | A | 7/1954 | Hosemann |
| 2,952,790 | A | 9/1960 | Steen |
| 3,679,927 | A | 7/1972 | Kirkendall |
| 3,741,797 | A | 6/1973 | Chavasse, Jr. et al. |
| 3,828,190 | A | 8/1974 | Dahlin et al. |

(Continued)

FOREIGN PATENT DOCUMENTS

| | | |
|---|---|---|
| DE | 1030936 | 5/1958 |

(Continued)

OTHER PUBLICATIONS

Sheather Journal Phys. E., Apr. 1973, pp. 319-322, vol. 6, No. 4.

(Continued)

*Primary Examiner*—Jack I Berman
*Assistant Examiner*—Meenakshi S Sahu
(74) *Attorney, Agent, or Firm*—Thorpe North & Western, LLP

(57) ABSTRACT

A high strength window for a radiation detection system includes a plurality of intersecting ribs defining a grid having openings therein with tops of the ribs terminate substantially in a common plane. The intersecting ribs are oriented non-perpendicularly with respect to each other and define non-rectangular openings. The window also includes a support frame around a perimeter of the plurality of intersecting ribs, and a film disposed over and spanning the plurality of intersecting ribs and openings. The film is configured to pass radiation therethrough. An associated radiation detection system includes a sensor disposed behind the window. The sensor is configured to detect radiation passing through the high strength window.

23 Claims, 2 Drawing Sheets

U.S. PATENT DOCUMENTS

| | | | | |
|---|---|---|---|---|
| 4,160,311 | A | 7/1979 | Ronde et al. | |
| 4,178,509 | A | 12/1979 | More et al. | |
| 4,184,097 | A | 1/1980 | Auge | |
| 4,293,373 | A | 10/1981 | Greenwood | |
| 4,393,127 | A | 7/1983 | Greschner et al. | |
| 4,443,293 | A | 4/1984 | Mallon et al. | |
| 4,463,338 | A | 7/1984 | Utner et al. | |
| 4,521,902 | A | 6/1985 | Peugeot | |
| 4,532,150 | A | 7/1985 | Endo et al. | |
| 4,576,679 | A | 3/1986 | White | |
| 4,584,056 | A | 4/1986 | Perret et al. | |
| 4,591,756 | A | 5/1986 | Avnery | |
| 4,608,326 | A | 8/1986 | Neukermans et al. | |
| 4,645,977 | A | 2/1987 | Kurokawa et al. | |
| 4,675,525 | A | 6/1987 | Amingual et al. | |
| 4,679,219 | A | 7/1987 | Ozaki | |
| 4,777,642 | A | 10/1988 | Ono | |
| 4,797,907 | A | 1/1989 | Anderton | |
| 4,819,260 | A | 4/1989 | Haberrecker | |
| 4,862,490 | A | 8/1989 | Karnezos et al. | |
| 4,885,055 | A | 12/1989 | Woodbury et al. | |
| 4,933,557 | A * | 6/1990 | Perkins et al. | 250/505.1 |
| 4,939,763 | A | 7/1990 | Pinneo et al. | |
| 4,957,773 | A | 9/1990 | Spencer et al. | |
| 4,960,486 | A | 10/1990 | Perkins et al. | |
| 4,979,198 | A | 12/1990 | Malcolm et al. | |
| 5,010,562 | A | 4/1991 | Hernandez et al. | |
| 5,066,300 | A | 11/1991 | Isaacson et al. | |
| 5,077,771 | A | 12/1991 | Skillicorn et al. | |
| 5,077,777 | A | 12/1991 | Daly | |
| 5,105,456 | A | 4/1992 | Rand et al. | |
| 5,117,829 | A | 6/1992 | Miller et al. | |
| 5,153,900 | A | 10/1992 | Nomikos et al. | |
| 5,161,179 | A | 11/1992 | Suzuki et al. | |
| 5,173,612 | A | 12/1992 | Imai et al. | |
| 5,217,817 | A | 6/1993 | Verspui et al. | |
| 5,226,067 | A | 7/1993 | Allred et al. | |
| RE34,421 | E | 10/1993 | Parker et al. | |
| 5,258,091 | A | 11/1993 | Imai et al. | |
| 5,267,294 | A | 11/1993 | Kuroda et al. | |
| 5,391,958 | A | 2/1995 | Kelly | |
| 5,400,385 | A | 3/1995 | Blake et al. | |
| 5,428,658 | A | 6/1995 | Oettinger et al. | |
| 5,432,003 | A | 7/1995 | Plano et al. | |
| 5,469,429 | A | 11/1995 | Yamazaki et al. | |
| 5,469,490 | A | 11/1995 | Golden et al. | |
| 5,478,266 | A | 12/1995 | Kelly | |
| RE35,383 | E | 11/1996 | Miller et al. | |
| 5,571,616 | A | 11/1996 | Phillips et al. | |
| 5,578,360 | A | 11/1996 | Viitanen | |
| 5,607,723 | A | 3/1997 | Plano et al. | |
| 5,621,780 | A | 4/1997 | Smith et al. | |
| 5,627,871 | A | 5/1997 | Wang | |
| 5,631,943 | A | 5/1997 | Miles | |
| 5,682,412 | A | 10/1997 | Skillicorn et al. | |
| 5,729,583 | A | 3/1998 | Tang et al. | |
| 5,812,632 | A | 9/1998 | Schardt et al. | |
| 6,002,202 | A | 12/1999 | Meyer et al. | |
| 6,005,918 | A | 12/1999 | Harris et al. | |
| 6,044,130 | A | 3/2000 | Inazura et al. | |
| 6,069,278 | A | 5/2000 | Chuang | |
| 6,075,839 | A | 6/2000 | Treseder | |
| 6,097,790 | A | 8/2000 | Gasegawa et al. | |
| 6,133,401 | A | 10/2000 | Jensen | |
| 6,134,300 | A | 10/2000 | Trebes et al. | |
| 6,184,333 | B1 | 2/2001 | Gray | |
| 6,205,200 | B1 | 3/2001 | Boyer et al. | |
| 6,282,263 | B1 | 8/2001 | Arndt et al. | |
| 6,288,209 | B1 | 9/2001 | Jensen | |
| 6,307,008 | B1 | 10/2001 | Lee et al. | |
| 6,320,019 | B1 | 11/2001 | Lee et al. | |
| 6,351,520 | B1 | 2/2002 | Inazaru | |
| 6,477,235 | B2 | 11/2002 | Chornenky et al. | |
| 6,487,272 | B1 | 11/2002 | Kutsuzawa | |
| 6,487,273 | B1 | 11/2002 | Takenaka et al. | |
| 6,546,077 | B2 | 4/2003 | Chornenky et al. | |
| 6,658,085 | B2 | 12/2003 | Sklebitz | |
| 6,661,876 | B2 | 12/2003 | Turner et al. | |
| 6,740,874 | B2 | 5/2004 | Doring | |
| 6,778,633 | B1 | 8/2004 | Loxley et al. | |
| 6,803,570 | B1 | 10/2004 | Bryson, III et al. | |
| 6,816,573 | B2 | 11/2004 | Hirano et al. | |
| 6,819,741 | B2 | 11/2004 | Chidester | |
| 6,852,365 | B2 | 2/2005 | Smart et al. | |
| 6,956,706 | B2 | 10/2005 | Brandon | |
| 6,976,953 | B1 | 12/2005 | Pelc | |
| 6,987,835 | B2 | 1/2006 | Lovoi | |
| 7,035,379 | B2 | 4/2006 | Turner et al. | |
| 7,085,354 | B2 | 8/2006 | Kanagami | |
| 7,130,380 | B2 | 10/2006 | Lovoi et al. | |
| 7,130,381 | B2 | 10/2006 | Lovoi et al. | |
| 7,224,769 | B2 | 5/2007 | Turner | |
| 7,233,647 | B2 | 7/2007 | Turner et al. | |
| 7,286,642 | B2 | 10/2007 | Ishikawa et al. | |
| 7,358,593 | B2 | 4/2008 | Smith et al. | |
| 7,382,862 | B2 | 6/2008 | Bard et al. | |
| 7,428,298 | B2 | 9/2008 | Bard et al. | |
| 2003/0152700 | A1 | 8/2003 | Asmussen et al. | |
| 2005/0018817 | A1 | 1/2005 | Oettinger et al. | |
| 2005/0141669 | A1 | 6/2005 | Shimono et al. | |
| 2006/0098778 | A1 | 5/2006 | Oettinger et al. | |
| 2006/0269048 | A1 | 11/2006 | Cain | |
| 2007/0111617 | A1 | 5/2007 | Meilahti | |
| 2008/0296479 | A1* | 12/2008 | Anderson et al. | 250/226 |
| 2008/0296518 | A1 | 12/2008 | Xu et al. | |

FOREIGN PATENT DOCUMENTS

| | | |
|---|---|---|
| DE | 4430623 | 3/1996 |
| DE | 19818057 | 11/1999 |
| EP | 0297808 | 1/1989 |
| EP | 0330456 | 8/1989 |
| GB | 1252290 | 11/1971 |
| JP | 57082954 | 8/1982 |
| JP | 3170673 | 7/1991 |
| JP | 05066300 | 3/1993 |
| JP | 06119893 | 7/1994 |
| JP | 6289145 | 10/1994 |

OTHER PUBLICATIONS www.moxtek.com, X-Ray Windows, ProLINE Series 20 Windows Ultra-thin Polymer X-ray Windows, 2 pages. Applicant believes that this product was offered for sale prior to the filing date of applicant's application.

Tien-Hui Lin et al., "An investigation on the films used as teh windows of ultra-soft X-ray counters." Acta Physica Sinica, vol. 27, No. 3, pp. 276-283, May 1978, abstract only.

Decker, U.S. Appl. No. 12/124,917, filed Jun. 1, 2007.

Viitanen Veli-Pekka et al., Comparison of Ultrathin X-Ray Window Designs, presented at the Soft X-rays in the 21st Century Conference held in Provo, utah Feb. 10-13, 1993, pp. 182-190.

Scholze et al., "Detection efficiency of energy-dispersive detectors with low-energy windows" X-Ray Spectrometry, X-Ray Spectrom, 2005: 34: 473-476.

Panayiotatos, et al., "Mechanical performance and growth characteristics of boron nitride films with respect to their optical, compositional properties and density," Surface and Coatings Technology, 151-152 (2002) 155-159.

www.moxtek,com, Moxtek, Sealed Proportional Counter X-Ray Windows, Oct. 2007, 3 pages.

www.moxtek.com, Moxtek, AP3 Windows, Ultra-thin Polymer X-Ray Windows, Sep. 2006, 2 pages.

www.moxtek.com, Moxtek, DuraBeryllium X-Ray Windows, May 2007, 2 pages.

www.moxtek.com, Moxtek, ProLine Series 10 Windows, Ultra-thin Polymer X-Ray Windows, Sep. 2006, 2 pages.

Das, K., and Kumar, K., "Tribological behavior of improved chemically vapor-deposited boron on beryllium," Thin Solid Films, 108(2), 181-188.

Micro X-ray Tube Operation Manual, X-ray and Specialty Instruments Inc., 1996, 5 pages.

http://www.orau.org/ptp/collectio/xraytubescollidge/MachlettCW250T.htm, 1999, 2 pages.

Anderson et al., U.S. Appl. No. 11/756,962, filed Jun. 1, 2007.

Roca i Cabarrocas, P., S. Kumar, and B. Drevillon, "In situ study of the thermal decomposition of B.sub.2 H.sub.6 by combining spectroscopic ellipsometry and Kelvin probe measurements," J. Appl. Phys. 66, 3286 (1989).

Comfort, J. H., "Plasma-enhanced chemical vapor deposition of in situ doped epitaxial silicon at low temperatures," J. Appl. Phys. 65, 1067 (1989).

Hanigofsky, J. A., K. L. More, and W. J. Lackey, "Composition and microstructure of chemically vapor-deposited boron nitride, aluminum nitride, and boron nitride + aluminum nitride composites," J. Amer. Ceramic Soc. 74, 301 (1991).

Komatsu, S., and Y. Moriyoshi, "Influence of atomic hydrogen on the growth reactions of amorphous boron films in a low-pressure B.sub.2 H.sub.6 +He+H.sub.2 plasma", J. Appl. Phys. 64, 1878 (1988).

Komatsu, S., and Y. Moriyoshi, "Transition from amorphous to crystal growth of boron films in plasma-enhanced chemical vapor deposition with B.sub.2 H.sub.6 +He," J. Appl. Phys., 66, 466 (1989).

Lee, W., W. J. Lackey, and P. K. Agrawal, "Kinetic analysis of chemical vapor deposition of boron nitride," J. Amer. Ceramic Soc. 74, 2642 (1991).

Maya, L., and L. A. Harris, "Pyrolytic deposition of carbon films containing nitrogen and/or boron," J. Amer. Ceramic Soc. 73, 1912 (1990).

Michaelidis, M., and R. Pollard, "Analysis of chemical vapor deposition of boron," J. Electrochem. Soc. 132, 1757 (1985). . Moore, A. W., S. L. Strong, and G. L. Doll, "Properties and characterization of codeposited boron nitride and carbon materials," J. Appl. Phys. 65, 5109 (1989).

Nakamura, K., "Preparation and properties of amorphous boron nitride films by molecular flow chemical vapor deposition," J. Electrochem. Soc. 132, 1757 (1985).

Perkins, F. K., R. A. Rosenberg, and L. Sunwoo, "Synchrotronradiation deposition of boron and boron carbide films from boranes and carbornes: decaroane," J. Appl. Phys. 69,4103 (1991).

Shirai, K., S.-I. Gonda, and S. Gonda, "Characterization of hydrogenated amorphous boron films prepared by electron cyclotron resonance plasma chemical vapor deposition method," J. Appl. Phys. 67, 6286 (1990).

Vandenbulcke, L. G., "Theoretical and experimental studies on the chemical vapor deposition of boron carbide," Indust. Eng. Chem. Prod. Res. Dev. 24, 568 (1985).

Winter, J., H. G. Esser, and H. Reimer, "Diborane-free boronization," Fusion Technol. 20, 225 (1991).

Das, D. K., and K. Kumar, "Chemical vapor deposition of boron on a beryllium surface," Thin Solid Films, 83(1), 53-60.

Komatsu, S., and Y. Moriyoshi, "Transition from thermal-to electron-impact decomposition of diborane in plasma-enhanced chemical vapor deposition of boron films from B.sub.2 H.sub.6 +He," J. Appl. Phys. 66, 1180 (1989).

Barkan et al., "Improved window for low-energy x-ray transmission a Hybrid design for energy-dispersive microanalysis," Sep. 1995, 2 pages, Ectroscopy 10(7).

Powell et al., "Metalized polyimide filters for x-ray astronomy and other applications," SPIE, pp. 432-440, vol. 3113.

Lines, U.S. Appl. No. 12/352,864, filed Jan. 13, 2009.

Lines, U.S. Appl. No. 12/726,120, filed Mar. 17, 2010.

* cited by examiner

X-RAY WINDOW WITH GRID STRUCTURE

FIELD OF THE INVENTION

The present invention relates generally to radiation detection systems and associated high strength radiation detection windows.

BACKGROUND

Radiation detection systems are used in connection with detecting and sensing emitted radiation. Such systems can be used in connection with electron microscopy, X-ray telescopy, and X-ray spectroscopy. Radiation detection systems typically include in their structure a radiation detection window, which can pass radiation emitted from the radiation source to a radiation detector or sensor, and can also filter or block undesired radiation.

Standard radiation detection windows typically comprise a sheet of material, which is placed over an opening or entrance to the detector. As a general rule, the thickness of the sheet of material corresponds directly to the ability of the material to pass radiation. Accordingly, it is desirable to provide a sheet of material that is as thin as possible, yet capable of withstanding pressure resulting from gravity, normal wear and tear, and differential pressure.

Since it is desirable to minimize thickness in the sheets of material used to pass radiation, it is often necessary to support the thin sheet of material with a support structure. Known support structures include frames, screens, meshes, ribs, and grids. While useful for providing support to an often thin and fragile sheet of material, many support structures can interfere with the passage of radiation through the sheet of material due to the structure's geometry, thickness and/or composition. The interference can be the result of the composition of the material itself and/or the geometry of the support structure. In addition, many known support structures have drawbacks. For example, screens and meshes can be rough and coarse, and thus the overlaid thin film can stretch, weaken and burst at locations where it contacts the screen or mesh. A drawback associated with unidirectional ribs is that the ribs can twist when pressure is applied. This twisting can also cause the overlaid film to stretch weaken and burst. Unidirectional ribs are set forth U.S. Pat. No. 4,933,557, which is incorporated herein by reference. Additionally, there can be substantial difficulty in manufacturing many known support structures, thus resulting in increased expense of the support structures and associated windows.

SUMMARY OF THE INVENTION

Accordingly, it has been recognized that it would be advantageous to develop a radiation detection system having a high strength, yet thin radiation detection window that is economical to manufacture, and further has the desirable characteristics of being minimally absorptive and minimizing interference with the passage of radiation therethrough. It is also desirable to provide a radiation window having a support structure that will maintain intact thin films that overlay the support structure.

Accordingly, the present invention provides a high strength window for a radiation detection system. A window for a radiation detection system includes a plurality of intersecting ribs defining a grid having openings therein, with tops of the ribs terminating substantially in a common plane. The intersecting ribs are oriented non-perpendicularly with respect to each other and define non-rectangular openings. The window also includes a support frame around a perimeter of the plurality of intersecting ribs, and a film disposed over and spanning the plurality of intersecting ribs and openings. The film is configured to pass radiation therethrough.

An associated radiation detection system includes a high strength window as described above and a sensor. The sensor is configured to detect radiation passing through the high strength window.

There has thus been outlined, rather broadly, various features of the invention so that the detailed description thereof that follows may be better understood, and so that the present contribution to the art may be better appreciated. Other features of the present invention will become clearer from the following detailed description of the invention, taken together with the accompanying claims, or may be learned by the practice of the invention.

DETAILED DESCRIPTION

Figure 1:
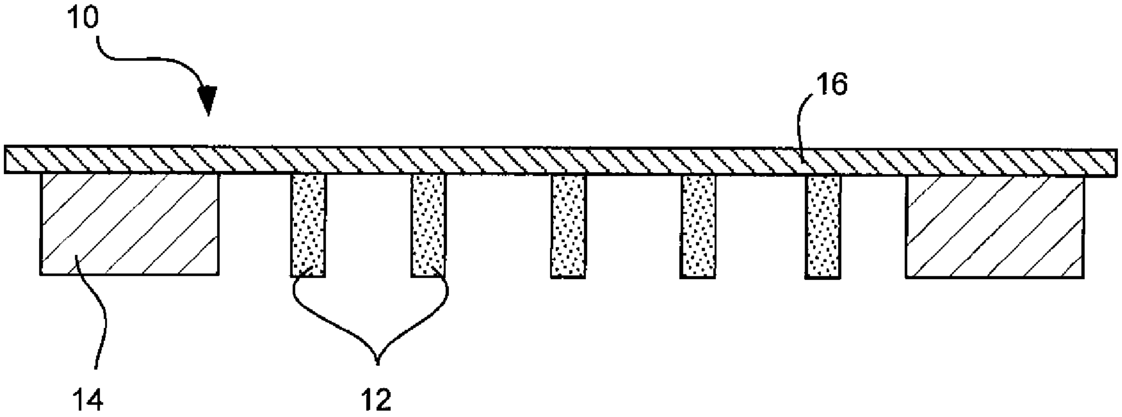
FIG. 1 is a cross-sectional view of a window in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention provides embodiments pertinent to a high strength window for a radiation detection system, an associated radiation detection system, and an associated method of manufacturing a high strength grid for a window in a radiation detection system. In accordance with these embodiments, various details are provided herein which are applicable to all three of the window, system and method.

Figure 3:
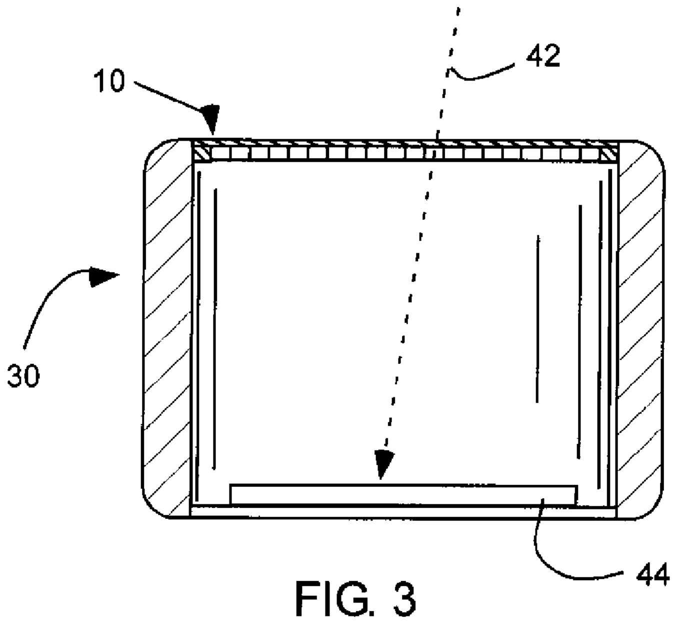
FIG. 3 is a cross-sectional schematic view of an x-ray detector system in accordance with the present invention with the window of FIG. 1.
Figure 2A:
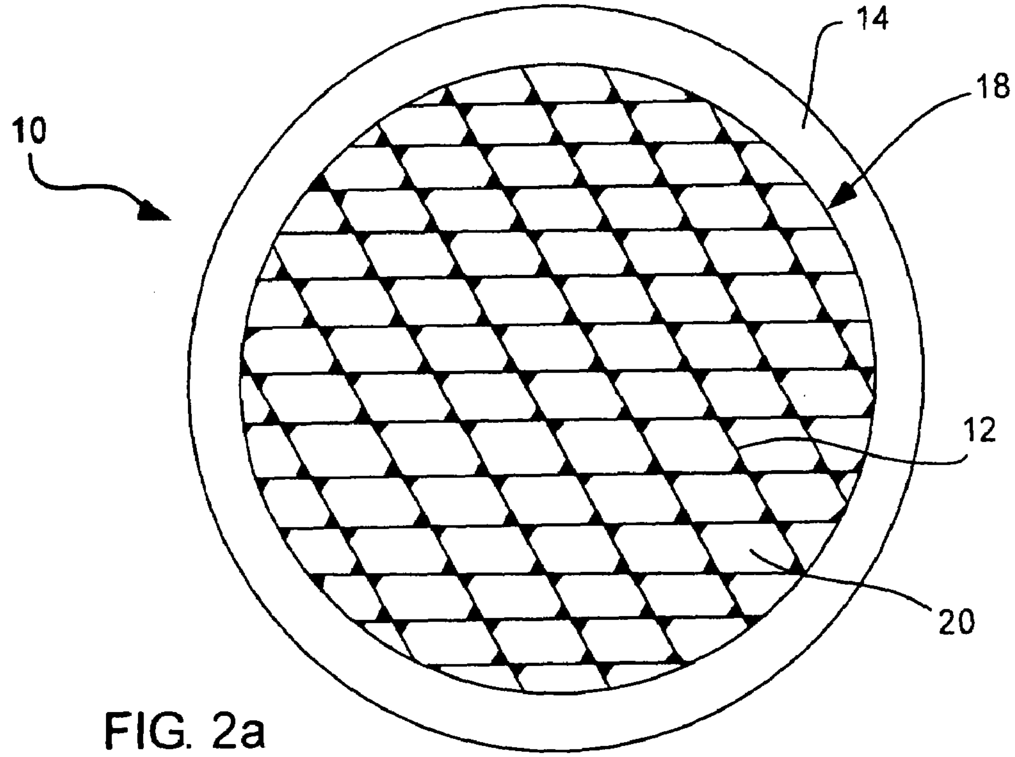
FIG. 2*a* is a top view of a support grid of the high strength window of FIG. 1.
Figure 2B:
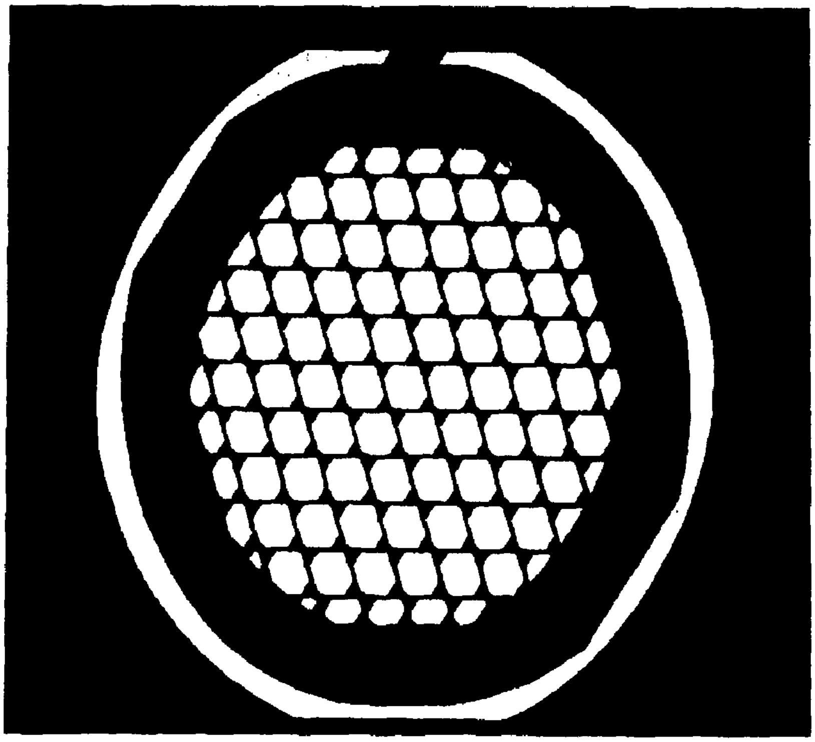
FIG. 2*b* is a photograph of the support grid of FIG. 2*a*.

As illustrated in FIGS. 1-2*b*, a high strength window, indicated generally at 10, is shown in accordance with an exemplary embodiment of the present invention. Specifically, the window 10 is configured for use in connection with a radiation detection system 30 (FIG. 3). The window and associated radiation detection system can be useful for a variety of applications including those associated with electron microscopy, X-ray telescopy, and X-ray spectroscopy. In use, radiation in the form of high energy electrons and high energy photons (indicated by line 42 in FIG. 3) can be directed toward the window of the radiation detection system. The window receives and passes radiation therethrough. Radiation that is passed through the window reaches a sensor 44 (FIG. 3), which generates a signal based on the type and/or amount of radiation it receives. The window can be oval, as shown in FIG. 2*b*.

As described above, the window 10 can be subjected to a variety of operating and environmental conditions, including for example, reduced or elevated pressures, a substantial vacuum, contamination, etc. Such conditions tend to motivate thicker, more robust windows. Such radiation detection systems, however, can potentially be utilized to sense or detect limited or weak sources. In addition, certain applications require or demand precise measurements. Such systems or applications tend to motivate thinner windows. Support ribs can span the window to provide support to thinner windows. These supports, however, can introduce stress concentrations into the window due to their structure (such as wire meshes), have different thermal conductivity than the window and introduce thermal stress, and can itself interfere with the radiation directly or even irradiate and introduce noise or errors. In addition, difficulty can arise in the manufacture of these supports, thus making these support structures costly and expensive. Therefore, it has been recognized that it would be advantageous to develop an economical window that is thin as possible and as strong as possible and resist introducing noise or interfering with the radiation.

The window 10 of the present invention has a plurality of intersecting ribs 12 defining a grid 18 having openings 20 therein, and a support frame 14 around a perimeter of the plurality of intersecting ribs. The support frame carries and supports the ribs. The window also has a thin film 16 disposed over and spanning the plurality of intersecting ribs and openings. This film is configured to pass radiation therethrough.

The support frame 14 can be made of the same material as the plurality of ribs 12 defining the grid 18. Accordingly, both the ribs and support frame can be or include a silicon material, although this is not required. According to one aspect, the support frame can be integral with the grid. In this case, both the support frame and grid can be formed from a single piece of material by removing or etching the openings 20 in the grid to leave the ribs joined at their ends to the support frame. Alternatively, the support frame can form a separate piece that can be coupled to the grid by an adhesive for example. In another embodiment, the support frame can be made of a material that is different from the material comprising the ribs. In addition to providing support for the grid and the layer of thin polymer film 16, the support frame can be configured to secure the window 10 to the appropriate location on a radiation detection system. Each rib comprising the plurality of intersecting ribs can be less than 100 μm wide.

The thin film 16 is disposed over and spans the plurality of ribs 12 and openings 20. The film can be selected to be highly transmissive of X-rays, for example, and of X-rays having energies greater than 100 electron volts, while blocking visible light energy and other unwanted radiation. In addition, the film can be selected to withstand fluid pressures of up to one atmosphere (caused by fluids into which the structure may be immersed) without breaking so that fluid may not penetrate the window.

The thin film can include a layer of polymer material, such as poly-vinyl formal (FORMVAR), butvar, parylene, kevlar, polypropylene, lexan or polyimide. Nonpolymer materials such as boron, carbon (including cubic amorphous and forms containing hydrogen), silicon, silicon nitride, silicon carbide, boron nitride, aluminum and beryllium could also be used. In one aspect, the film can include doped silicon, Desirably, the film should be configured to avoid punctures, uneven stretching and localized weakening. To further reduce the chance of these undesirable characteristics, the tops of the ribs 12 can be rounded and/or polished to eliminate sharp corners and rough surfaces.

The thin film should be thick enough to withstand pressures to which it will be exposed, such as gravity, normal wear and tear and the like. However, as thickness of the layer increases so does undesirable absorption of radiation. If radiation is absorbed by the layer of thin material, it will not reach the sensor or detector. This is particularly true with respect to soft X-rays, which are likely to be absorbed by a thicker film. Therefore, it is desirable to provide a thin film that is as thin as possible but sufficiently thick to withstand the pressures explained above. In one aspect, the film will be able to withstand at least one atmosphere of pressure, and thus the film can have a thickness substantially equal to or less than about 1 μm (1000 nm).

In addition, a gas barrier film layer can be disposed over the thin film.

The material comprising the thin film 16 can be different than the material comprising the intersecting ribs 12 and/or support frame 14. Alternatively, all three of the thin film material, ribs and support frame can be or include the same material. According to one embodiment, the thin film, the support frame and the intersecting ribs can be integrally formed of the same material. By way of example, and not by way of limitation, silicon may be used for this purpose. In another embodiment, the plurality of intersecting ribs can comprise silicon and the thin film material can comprise a polymeric film.

To reduce the chance of damage that can result to the thin film 16 overlaying the grid 18, the top edges of the intersecting ribs 12 can be rounded and/or polished to eliminate sharp corners and rough surfaces which might otherwise cause damage. In one aspect, forming the ribs from a single crystal of silicon by etching results in the rounding and polishing action desired. Alternatively, if other materials and method of construction are used, the tops of the ribs may require rounding and/or polishing via known mechanical and/or chemical processes.

As indicated, the ribs define a grid 18 having openings 20 therein. The ribs terminate substantially in a common plane. The ribs 12 can include or can be formed entirely of a silicon material in order to provide a high strength support for the thin film while being as thin as possible. For example, the height of the ribs can range from about 100 μm to about 385 μm, and the width of each rib can be about 60 μm. The ribs are oriented non-perpendicularly with respect to each other and define non-rectangular openings. Non-rectangular openings can assume a variety of different shapes so long as the ribs defining the openings intersect one another at other than 90 degree angles. The ribs can include a first set of parallel ribs that intersect and are oriented non-orthogonally to a second set of parallel ribs.

According to one embodiment, the openings 20 can be shaped substantially like a hexagon. The openings can also be shaped in the form of a trapezoid, such as a parallelogram. This shape can prevent twisting problems that are commonly associated with unidirectional line ribs, which experience maximum stress at the two opposing ends of the longest rib when the window receives a pressure load. When a window incorporating the unidirectional line ribs fails it is usually due to breakage at one or both ends of the longest rib. Mechanical analysis also indicates that many structures incorporating support ribs will twist when a load is applied to the window. This twisting action weakens the rib support structure and the window in general.

The arrangement of ribs 12 and openings 20 in the grid 18 of the present invention can minimize or even prevent the twisting problems experienced in prior teachings. According to one embodiment, at least one corner of each opening includes a fillet that is partially filled with a material, such as the same material as the ribs. By filling the corners, twisting action of the ribs can be further minimized or eliminated altogether. Filling the corners also results in an overall increase in strength of the support grid.

The material used to fill the corners of the openings 20 and the material used to form the ribs 12 can be the same. In one embodiment, this material can be or can include silicon, although the present invention is not limited to the use of silicon. The intersecting ribs can be integrally formed from a single piece of material. Silicon can also be incorporated into this embodiment. Likewise, the ribs and the filled corners can be formed from a single piece of silicon material by removing or etching the openings or cavities to form the interwoven grid 18. The manufacture of the ribs and filling of corners can occur substantially simultaneously. Alternatively, the ribs can be formed first and the corners filled thereafter. In this case, the ribs may comprise a material that is not the same as the material used to fill the corners of the openings.

The result of the geometry of the intersecting ribs 12 in combination with the filled corners of the openings 20 is that the tolerant strength of the window 10 is increased. By increasing the tolerant strength, it is possible to also increase the percentage of open area within the support frame 14 and/or reduce the overall height of the ribs, both of which are desirable characteristics since this they increase the ability of the window to pass radiation.

Specifically, in accordance with the present invention, the openings 20 preferably occupy more area within the perimeter of the support frame 14 than the plurality of ribs 12 or grid. This is due to the fact that the openings will typically absorb less radiation than the surrounding ribs and radiation can more freely pass through the openings than through the ribs. In one aspect, the openings take up between about 75% to about 90% of the total area within the perimeter of the support frame. For example, in one embodiment the openings in the grid comprise at least about 75% of the total area within the perimeter of the support frame and the plurality of ribs comprise no more than about 25% of the total area within the perimeter support frame. Alternatively, the openings can comprise at least about 90% of the total area within the support frame, and the plurality of ribs can comprise no more than about 10% of the total area within the frame.

In addition to increasing the open area within the support frame 14, the arrangement of ribs 12 and openings 20 makes it possible to reduce the height and/or thickness of the ribs, and thus the collimation required for passing radiation through the window 10 can be reduced to some degree. By reducing the amount of collimation required it is possible to increase the amount of radiation that can pass though the window since the amount of collimation required is proportional to the amount of radiation that is absorbed, and therefore not passed through the window.

Referring to FIG. 3, the window 10 can be part of a radiation detection system 30. The radiation detection system can include a high strength window for passing radiation 42 therethrough, which is described in detail in the embodiments set forth above. The radiation detection system 30 also can include a sensor 44 disposed behind the window. The sensor can be configured to detect radiation that passes through the window, and can further be configured to generate a signal based on the amount and/or type of radiation detected. The sensor 44 can be operatively coupled to various signal processing electronics.

A method of manufacturing a high strength grid for a window in a radiation detection system includes growing a first oxide layer on a bare silicon wafer by thermal oxidation. The oxide layer can then be patterned by traditional lithography techniques. The plurality of intersecting ribs can be formed by anisotropic etching of a silicon wafer. Since the silicon etching rate along some particular planes of single silicon is much faster than other directions, those silicon beams have super flat side walls. As a result of the etching, the corners near the ends of those ribs and the edges between the top and bottom surfaces and side walls of the ribs can be very sharp and rough. The corners can be rounded and smoothed.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth herein.

The invention claimed is:

1. A window for a radiation detection system, the window comprising:

a) a plurality of intersecting ribs defining a grid having openings therein, wherein tops of the ribs terminate substantially in a common plane;

b) the plurality of intersecting ribs being oriented non-perpendicularly with respect to each other and defining non-rectangular openings;

c) a support frame disposed around a perimeter of the plurality of intersecting ribs;

d) a film disposed over and spanning the plurality of intersecting ribs and openings to pass radiation therethrough; and e) the plurality of intersecting ribs, the support frame and the film material include a same material.

2. A window as in claim 1, wherein the non-rectangular openings have a substantially parallelogram shape.

3. A window as in claim 1, wherein at least one corner of each opening is partially filled with a same material as the ribs.

4. A window as in claim 1, wherein the openings of the grid are hexagonal.

5. A window as in claim 1, wherein at least one corner of the openings includes a fillet with a width greater than a width of the ribs.

6. A window as in claim 1, wherein the intersecting ribs are integrally formed from a single piece of material.

7. A window as in claim 1, wherein the plurality of intersecting ribs, the support frame and the film material are integrally formed of the same material.

8. A window as in claim 1, wherein the same material is a polymer.

9. A window as in claim 1, wherein each rib comprising the plurality of intersecting ribs is about less than 100 μm wide.

10. A window as in claim 1, wherein the plurality of ribs includes a first set of parallel ribs oriented non-orthogonal with respect to and intersecting a second set of parallel ribs.

11. A window as in claim 1, further comprising a gas barrier film layer disposed over the film.

12. A radiation detection system comprising:

a) a window to pass radiation therethrough, the window comprising:

i) a plurality of intersecting ribs defining a grid having openings therein, wherein tops of the ribs terminate substantially in a common plane;

ii) a support frame disposed around and supporting the grid;

iii) a film disposed over and spanning the plurality of intersecting ribs and openings; and b) a sensor disposed behind the window configured to detect radiation passing through the window.

13. A radiation detection system as in claim 12, wherein the plurality of intersecting ribs define non-rectangular openings having a substantially parallelogram shape.

14. A radiation detection system as in claim 12, wherein at least one corner of each opening is partially filled with a same material as the ribs.

15. A radiation detection system as in claim 12, wherein the openings of the grid are hexagonal.

16. A radiation detection system as in claim 12, wherein at least one corner of the openings includes a fillet with a width greater than a width of the ribs.

17. A radiation detection system as in claim 12, wherein the intersecting ribs are integrally formed from a single piece of material.

18. A radiation detection system as in claim 12, wherein the plurality of intersecting ribs, the support frame and the film material are integrally formed of the same material.

19. A radiation detection system as in claim 12, wherein the plurality of intersecting ribs comprise silicon, and wherein the film comprises a polymeric film.

20. A radiation detection system as in claim 12, wherein each rib comprising the plurality of intersecting ribs is about less than 100 μm wide.

21. A radiation detection system as in claim 12, wherein the plurality of ribs includes a first set of parallel ribs oriented non-orthogonal with respect to and intersecting a second set of parallel ribs.

22. A window for a radiation detection system, the window comprising:

a) a plurality of intersecting ribs defining a grid having openings therein, wherein tops of the ribs terminate substantially in a common plane;

b) the plurality of intersecting ribs being oriented non-perpendicularly with respect to each other and defining non-rectangular openings;

c) a support frame disposed around a perimeter of the plurality of intersecting ribs;

d) wherein the openings take up about 81% to about 90% of a total area within the perimeter of the support frame; and e) a film disposed over and spanning the plurality of intersecting ribs and openings to pass radiation therethrough.

23. A window for a radiation detection system, the window comprising:

a) a plurality of intersecting ribs defining a grid having openings therein, wherein tops of the ribs terminate substantially in a common plane;

b) the plurality of intersecting ribs being oriented non-perpendicularly with respect to each other and defining non-rectangular openings;

c) the plurality of intersecting ribs include a silicon material;

d) a support frame disposed around a perimeter of the plurality of intersecting ribs; and e) a film disposed over and spanning the plurality of intersecting ribs and openings to pass radiation therethrough.

* * * * *